United States Patent [19]

Suzuki et al.

[11] Patent Number: 5,704,219

[45] Date of Patent: Jan. 6, 1998

[54] AIR CONDITIONING APPARATUS

[75] Inventors: Takahisa Suzuki, Kariya; Mitsuo Inagaki, Okazaki; Sadahisa Onimaru, Chiryu; Yukikatu Ozaki, Nishio; Toshihiro Nagata, Tokoname, all of Japan

[73] Assignees: Nippondenso Co., Ltd., Kariya; Nippon Soken, Inc., Nishio, both of Japan

[21] Appl. No.: 681,837

[22] Filed: Jul. 29, 1996

[30] Foreign Application Priority Data

Aug. 1, 1995 [JP] Japan .................. 7-196421
Sep. 26, 1995 [JP] Japan .................. 7-247933

[51] Int. Cl.⁶ .......................... G05D 23/00; F25B 41/04
[52] U.S. Cl. .......................... 62/222; 62/197; 237/2 B
[58] Field of Search .............. 62/197, 526, 222, 62/90; 237/2 B

[56] References Cited

U.S. PATENT DOCUMENTS 5,056,329 10/1991 Wilkinson .................. 62/197
5,370,307 12/1994 Uehra ....................... 237/28
5,477,700 12/1995 Iio ......................... 62/90 X

FOREIGN PATENT DOCUMENTS 5-319077 12/1993 Japan.

Primary Examiner—William E. Wayner
Attorney, Agent, or Firm—Harness, Dickey & Pierce

[57] ABSTRACT

In an air conditioning apparatus employing a heat pump system in which a cooling evaporator and a heating condenser are disposed inside the compartment. A compressor is provided with a gas injection port, a fixed throttle for reducing pressure of refrigerant on high pressure side in a refrigerating cycle to middle pressure, and a gas-liquid separator for separating the middle pressure refrigerant of which pressure is reduced by the fixed throttle. The gaseous refrigerant separated by the gas-liquid separator is introduced into the gas injection port. In a heating operation, the refrigerant circulates through the compressor, the condenser, the fixed throttle, the gas-liquid separator, an expansion valve, an outdoor heat exchanger, and the compressor as a closed circuit, while the gaseous refrigerant separated by the gas-liquid separator is injected into the compressor through the gas injection port. As a result, when the outside air temperature is low, the heating capacity is improved.

14 Claims, 14 Drawing Sheets

| MODE | FOUR-WAY VALVE 23 | SOLENOID VALVE 28a | SOLENOID VALVE 28b |
|---|---|---|---|
| COOLING | COOLING | CLOSE | OPEN |
| HEATING | HEATING | OPEN | CLOSE |
| DEHUMIDIFICATION | HEATING | CLOSE | OPEN |

FIG. 10

| MODE | FOUR-WAY VALVE 23 | SOLENOID VALVE 28a | SOLENOID VALVE 28b | SOLENOID VALVE 28c | SOLENOID VALVE 28d | SOLENOID VALVE 28e |
|---|---|---|---|---|---|---|
| COOLING | COOLING | CLOSE | CLOSE | CLOSE | CLOSE | CLOSE |
| HEATING | HEATING | OPEN | CLOSE | CLOSE | OPEN | OPEN |
| LOW TEMPERATURE DEHUMIDIFYING C | ← | CLOSE | CLOSE | OPEN | CLOSE | CLOSE |
| MIDDLE TEMPERATURE DEHUMIDIFYING M | ← | CLOSE | OPEN | CLOSE | OPEN | CLOSE |
| HIGH TEMPERATURE DEHUMIDIFYING H | ← | CLOSE | CLOSE | CLOSE | OPEN | OPEN |

FIG. 12

| MODE | FOUR-WAY VALVE 23 | SOLENOID VALVE 28a | SOLENOID VALVE 28b | SOLENOID VALVE 28e |
|---|---|---|---|---|
| COOLING | COOLING | CLOSE | OPEN | CLOSE |
| HEATING | HEATING | OPEN | CLOSE | CLOSE |
| MIDDLE TEMPERATURE DEHUMIDIFYING M | HEATING | CLOSE | OPEN | CLOSE |
| HIGH TEMPERATURE DEHUMIDIFYING H | HEATING | CLOSE | CLOSE | OPEN |

AIR CONDITIONING APPARATUS

CROSS REFERENCE TO RELATED APPLICATIONS

This application is based upon and claims the benefit of priority of the prior Japanese Patent Applications No. Hei. 7-196421 filed on Aug. 1, 1995, and NO. Hei. 7-247933 filed on Sep. 26, 1995, the contents of which are incorporated herein by reference.

BACKGROUND OF THE INVENTION

1. Field of the Invention

The present invention generally relates to an air conditioning apparatus for vehicles, which employs a gas injection cycle in a heat pump system capable of performing dehumidifying and heating operation to improve the heating capacity when outside air temperature is low. More particularly, the present invention relates to an air conditioning apparatus for electric vehicles used in cold districts.

2. Related Arts

When a heat pump system having an electric compressor is mounted on a vehicle such as an electric vehicle, it is necessary to prevent windshield glass from being clouded or to defrost the windshield glass in order to secure safety when the vehicle is running. In JP-A-5-319077, as indoor heat exchangers, an evaporator only for cooling and a condenser only for heating are installed independently to prevent the windshield glass from being clouded by rapid evaporation of condensed water when a cooling mode is switched to a heating mode. Further, the condenser only for heating re-heats conditioned air to a required temperature while the evaporator only for cooling dehumidifies the conditioned air, whereby the dehumidify and heating operation can be performed.

However, in the conventional apparatus, when the outside air temperature is low, amount of endotherm in an outdoor heat exchanger which functions as an evaporator for heating decreases, so that suction pressure of a compressor becomes low. Therefore, specific volume of the refrigerant becomes large, thus decreasing circulating amount of the refrigerant. Consequently, there occurs a problem that the heating capacity is lowered.

Further, when the suction pressure of the compressor is lowered, compression ratio becomes large, whereby discharge temperature of the refrigerant increases. Therefore, the compressor can not be used at its maximum capacity (maximum rotational speed) to protect itself, whereby there occurs a problem the heating capacity is more lowered.

Because of the above mentioned problems, in the conventional apparatus, the heating capacity for the passenger compartment in the vehicle is insufficient in such cold districts as the outside air temperature is lower than −10° C.

In JP-A-1-114668, another conventional apparatus having a gas injection cycle is disclosed to improve the heating capacity. As shown in FIG. 20, in the conventional refrigerating cycle, a compressor 101, a condenser 102, a first electric expansion valve 103, a gas-liquid separator 104, a second electric expansion valve 105, and an evaporator 106 are connected sequentially by refrigerant piping 107, so that gaseous refrigerant separated in the gas-liquid separator 104 is injected into the compressor 101 through a gas injection passage 108.

A control unit 109 controls the first electric expansion valve 103 so that supercooling degree of the condenser 102 is set to be lower than a predetermined value. Therefore, the amount of gas injection is maintained at the most suitable value, and the sufficient heating capacity of the condenser 102 can be obtained.

However, since the first electric expansion valve 103 is controlled so that the supercooling degree of the condenser 102 is always set to be lower than the predetermined value, efficiency of the refrigerating cycle may deteriorate. Further, when the predetermined degree is set so as to secure the sufficient efficiency of the refrigerating cycle, the required heating capacity may not be obtained, thus resulting in a shortage of the heating capacity.

Moreover, since the above mentioned apparatus includes a single indoor heat exchanger, which is commonly used for cooling and heating, the dehumidifying and heating function for re-heating the conditioned air which has been dehumidified to the required temperature cannot be performed. As a result, the windshield glass is easily clouded under the operating condition where the humidity of the sucked air is high.

SUMMARY OF THE INVENTION

The present invention has been accomplished in view of the above mentioned problems and it is an object of the present invention to provide an air conditioning system employing a gas injection cycle in a heat pump system in which an evaporator only for cooling and a condenser only for heating is provided independently to perform dehumidifying and heating operation.

It is another object of the present invention to provide an air conditioning system employing a gas injection cycle to improve the heating capacity when the outside air temperature is low.

It is still another object of the present invention to provide an air conditioning system employing a gas injection cycle capable of obtaining sufficient heating capacity as needed while efficiency of refrigerating cycle is improved.

According to the present invention, in an air conditioning apparatus equipped with an evaporator disposed on an upstream side, a condenser disposed on a downstream side, an outdoor heat exchanger disposed outside the air passage, and an compressor, the compressor is provided with a suction port for sucking said refrigerant on low pressure side in a refrigerating cycle, a gas injection port for injecting middle pressure gaseous refrigerant into said refrigerating cycle and a discharge port for discharging compressed refrigerant. Further, there are provided first pressure reducing means for reducing pressure of the refrigerant in high pressure side to middle pressure, a gas-liquid separator for separating the refrigerant, pressure of which is reduced in the first pressure reducing means to the middle pressure, and second pressure reducing means for reducing pressure of liquid refrigerant separated in said gas-liquid separator.

In a heating operation, the refrigerant circulates through the compressor, the condenser, the first pressure reducing means, the gas-liquid separator, the second pressure reducing means, and the outdoor heat exchanger in this order, while said gaseous refrigerant separated in the gas-liquid separator is introduced into the gas injection port.

In a cooling operation, the refrigerant circulates at least through said compressor, the outdoor heat exchanger, said second pressure reducing means and the evaporator in this order.

In a dehumidifying operation, the refrigerant circulates at least through said compressor, the condenser, the second pressure reducing means and the evaporator in this order.

In the above mentioned constitution, by switching the flow of the refrigerant into the cooling evaporator or into the heating condenser, each mode of cooling operation, heating operation, and dehumidifying operation can be performed favorably.

In the heating mode, the gaseous refrigerant separated by the gas-liquid separator is injected into the compressor being on the compressing process, whereby the amount of the work of compression is increased, thus improving the heating capacity. Further, the gaseous refrigerant which is on the way of compressing and heating in the compressor is cooled by the saturated gaseous refrigerant, so that a discharge refrigerant temperature is lowered. Therefore, the compressor can be used with its maximum capacity (maximum rotational speed). As a result, when outside air temperature is low, the heating capacity can be improved efficiently.

The gaseous refrigerant separated by the gas-liquid separator may be injected to the compressor being on the compressing process in the cooling and dehumidifying modes, whereby coefficient of performance is increased, thus improving the cooling and the dehumidifying capacity.

The first pressure reducing means may include a fixed throttle.

Further, an electric expansion valve may be used as first pressure reducing means so that an opening degree thereof is controlled.

That is, when heating capacity of the condenser reaches the predetermined value, the opening degree of the electric expansion valve is controlled so that efficiency of the refrigerating cycle becomes its maximum. When heating capacity of the condenser does not reach the predetermined value, the opening degree of the electric expansion valve is increased so that the amount of gas-injection is increased. Therefore, the amount of the work of compression is increased, thus improving the heating capacity.

Further, when lord of the compressor is over a predetermined value, the opening degree of the electric expansion valve may be controlled to be closed, whereby overload of the compressor can be prevented.

Further, when temperature of the compressor is over a determined temperature, the opening degree of the electric expansion valve may be controlled to be opened, whereby the amount of gas-injection is increased so that the temperature of the compressor is lowered.

Other objects and features of the present invention will become more readily apparent from a better understanding of the preferred embodiments described below with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the present invention, and wherein:

FIG. 10 is a table showing operated states of valves in each operation mode in the second embodiment;

FIG. 12 is a table showing operated states of valves in each operation mode in the third embodiment;

DETAILED DESCRIPTION OF THE PRESENTLY PREFERRED EXEMPLARY EMBODIMENTS

Embodiments according to the present invention will be described hereinafter with respect to the drawings.

A first embodiment of the present invention will be described.

Figure 1:
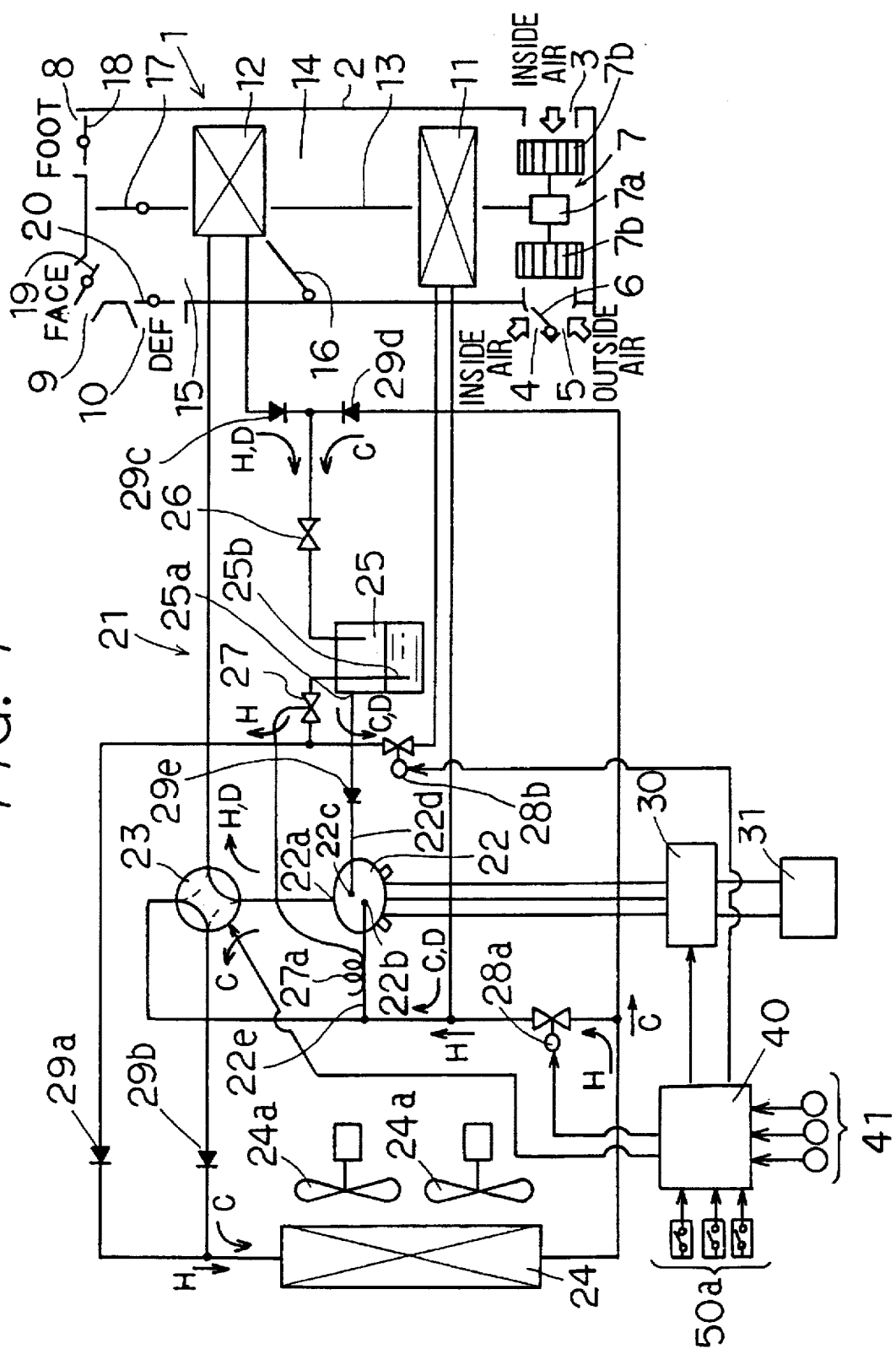
FIG. 1 is a diagram showing a refrigerating cycle in a first embodiment according to the present invention.

FIG. 1 schematically shows a refrigerating cycle of the first embodiment in which the present invention is applied to an air conditioning apparatus for an electric vehicle. An air conditioning unit 1 is disposed within a passenger compartment, and an air conditioning duct 2 of the air conditioning unit 1 forms a conditioned air passage for introducing conditioned air into the passenger compartment. Air inlets 3, 4 and 5 are formed at an end of the air conditioning duct 2 for sucking inside/outside air. The air inlet 4 for sucking the inside air and the air inlet 5 for sucking the outside air are switched to be open or closed by means of an inside/outside air switching door 6.

A blower for blowing the air into the air conditioning duct 2 is disposed adjacent to the air inlets 3 to 5. The blower 7 includes a motor 7a and centrifugal fans 7b which are driven by the motor 7a. Further, several air outlets communicating with the passenger compartment are formed at the other end of the air conditioning duct 2. The air outlets are a foot air outlet 8 for blowing out the conditioned air toward the feet of the passenger in the passenger compartment, a face air outlet 9 for blowing out the conditioned air toward the upper half of the body of the passenger in the passenger compartment, and a defroster air outlet 10 for blowing out the conditioned air toward the inside surface of the windshield glass.

An cooling evaporator 11 is provided within the air conditioning duct 2 on the downstream side from the blower 7. The cooling evaporator 11 is an indoor heat exchanger forming a part of a refrigerating cycle 21 and functions as a refrigerator for dehumidifying and cooling the air within the air conditioning duct 2 by the endothermic action of the refrigerant flowing therethrough in the cooling and the dehumidifying modes (described later).

Further, a heating condenser 12 is provided within the air conditioning duct 2 on the downstream side from the cooling evaporator 11. The heating condenser 12 is the other indoor heat exchanger forming a part of a refrigerating cycle 21 and functions as a heater for heating the air within the air conditioning duct 2 by the radiating action of the refrigerant flowing therethrough in the heating mode (described later).

The air passage in the air conditioning duct 2 is divided by a partition wall 13 into a first air passage 14 on the side of the foot air outlet 8 and a second air passage 15 on the side of the face air outlet 9 and the defroster air outlet 10. Therefore, in winter, the high temperature inside air is sucked from the air inlet 3 into the air passage 14 on the side of the foot air outlet 8 so that warm air is blown out to the feet of the passenger, whereby the load of heating can be reduced. At the same time, the low humidity outside air is sucked from the air inlet 5 into the air passage 15 on the side of the defroster air outlet 10, whereby the windshield glass can be prevented from being clouded certainly.

A door 16 opens or closes the second air passage 15, and a door 17 opens or closes the partition portion between the first air passage 14 and the second air passage 15. Doors 18, 19, and 20 open or close air passages of the air outlets 8, 9, and 10, respectively.

The above mentioned refrigerating cycle 21 is constituted as a heat pump type refrigerating cycle for performing cooling or heating operation of the passenger compartment with the cooling evaporator 11 and the heating condenser 12, and includes the following equipments in addition to the evaporator 11 and the condenser 12.

That is, the refrigerating cycle 21 includes a refrigerant compressor 22, an electromagnetic four-way valve 23 for switching the flow of the refrigerant, an outdoor heat exchanger 24, a gas-liquid separator 25 for separating into the gaseous refrigerant and the liquid refrigerant while accumulating the liquid refrigerant, a fixed throttle (a first pressure reducing means) 26 for reducing pressure of the refrigerant on the high pressure side in the cycle to the middle pressure (for example, about 4–15 kg/cm$^2$) before the refrigerant is introduced to the gas-liquid separator 25, a thermostatic expansion valve (a second pressure reducing means) 27, solenoid valves 28a, 28b and check valves 29a–29e. The throttle like an orifice is used for the fixed throttle 26.

The outdoor heat exchanger 24 is installed outside the passenger compartment of the electric vehicle so as to exchange heat with outside air blown by outdoor electric fans 24a. The refrigerant compressor 22 is electrically operated, while an AC motor (not shown) is integrally disposed within its sealed case and drives the compressor 22 so as to suck, compress and discharge the refrigerant.

AC motor of the refrigerant compressor 22 is supplied with AC voltage by an inverter 30. The inverter 30 modulates frequency of AC voltage so that rotational speed of the AC motor continuously varies. Therefore, the inverter 30 functions as rotational speed adjusting means of the compressor 22 and is supplied with DC voltage from a battery 31 mounted on the vehicle.

The compressor 22 is equipped with a discharging port 22a for discharging the compressed refrigerant, an suction port 22b for sucking the refrigerant on the low pressure side in the cycle, and a gas injection port 22c for injecting the middle pressure gaseous refrigerant which is separated by the gas-liquid separator 25. The gas injection port 22c communicates with a gaseous refrigerant outlet 25 formed on an upper portion of the separator 25 through a gas injection passage 22d where the check valve 29e is provided.

Further, a temperature sensing bulb 27a for the thermostatic expansion valve 27 is disposed in a refrigerant suction passage 22e connected to the suction port 22b. The opening degree of the expansion valve 27 is adjusted so that the overheating degree of the refrigerant in the suction passage 22e is set to be a predetermined value. Further, the inverter 30 is electrically controlled by an air conditioning control unit 40.

The air conditioning control unit 40 is an electric control unit including an microcomputer and its relative circuits. The control unit 40 controls the switching of the four-way valve 23 and opening and closing of the solenoid valves 28a and 28b. In this embodiment, the four-way valve 23 and the solenoid valve 28a and 28b constitutes route switching means for switching the cyclic route of the refrigerant.

To the control unit 40 are input sensing signals from an air conditioning sensor group 41 including an outside air temperature sensor for sensing the outside air temperature, an post-evaporator air temperature sensor for sensing the temperature of the air which has been just blown out from the cooling evaporator 11, a discharge pressure sensor for sensing the pressure (the high pressure in the cycle) of the refrigerant which has discharged from the compressor 21 and the like.

Further, signals from each lever and each of switch group 50a on an air conditioning control panel 50 (see FIG. 2) disposed near the driver's seat is input to the control unit 40.

Although the electrical connections are not shown in FIG. 1, the doors 4, 16, 17, 18, 19 and 20, the blower 7 and the outdoor fans 24a are also controlled by the control unit 40.

Figure 2:
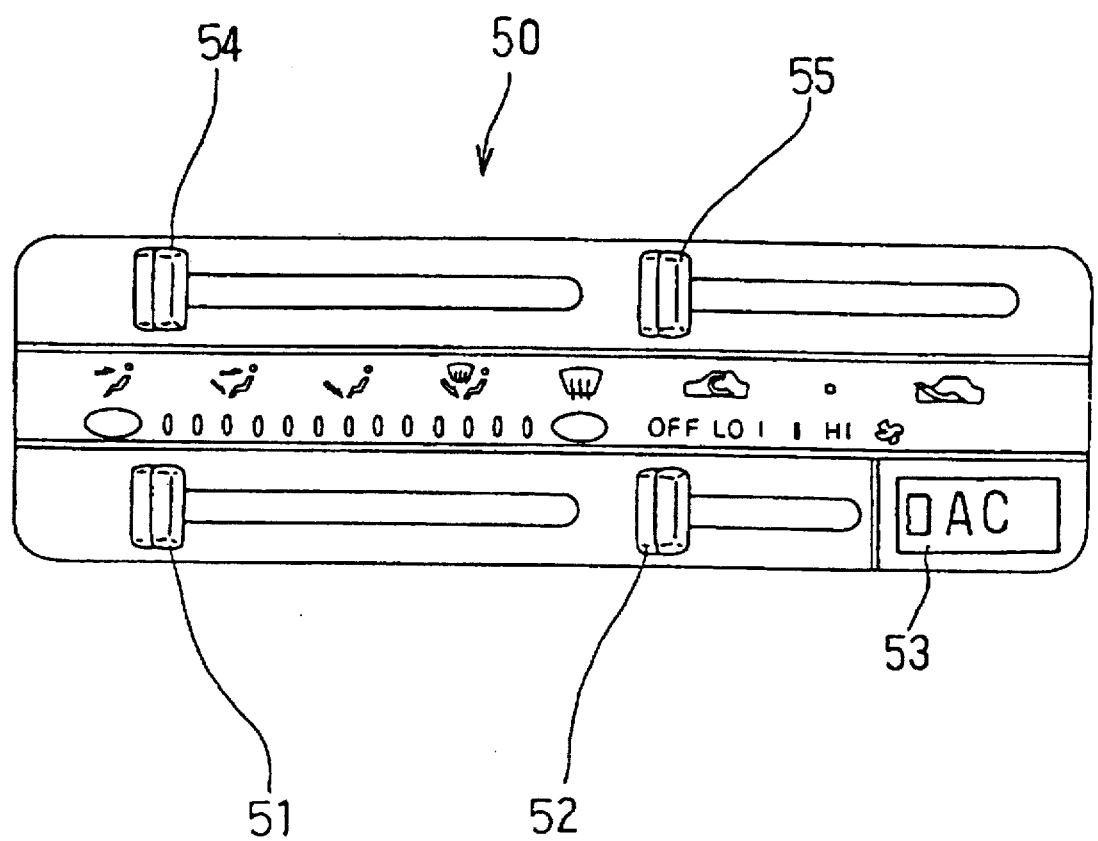
FIG. 2 is a front view showing a control panel of the air conditioning apparatus in the first embodiment.
Figure 3:
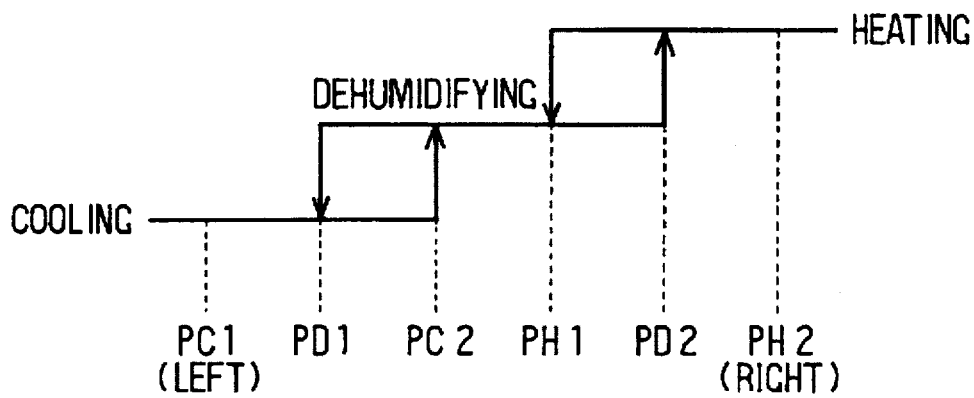
FIG. 3 is a characteristics chart in an entire operation range of a temperature setting lever on the control panel of the air conditioning apparatus shown in FIG. 2.

The air conditioning control panel 50 shown in FIG. 2 has the following operating members which are manually operated by the passenger. A temperature setting lever 51 sets a target temperature of the air blown into the passenger compartment. In this embodiment, the lever 51 is constructed so as to set a target value for adjusting rotational speed of the electric compressor 22. Further, the operations of the four-way valve 23 and the solenoid valves 28a and 28b are controlled in response to the target value set by the operated position of the temperature setting lever 51, whereby operation mode of the refrigerating cycle is switched. That is, as shown in FIG. 3, when the operated position of the lever 51 is moved from the left side to the right side, the cooling mode, the dehumidifying mode and the heating mode are set in this order.

Figure 4:
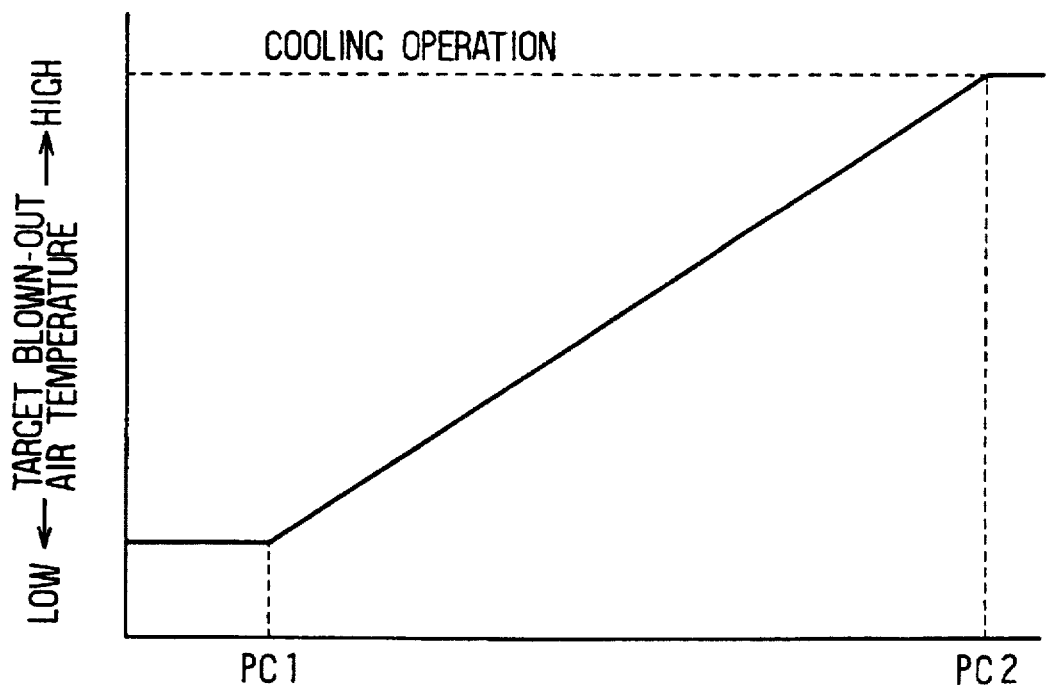
FIG. 4 is a graph showing a relationship between a position of the temperature setting lever and a target blown-out air temperature of an evaporator in a cooling operation.
Figure 5:
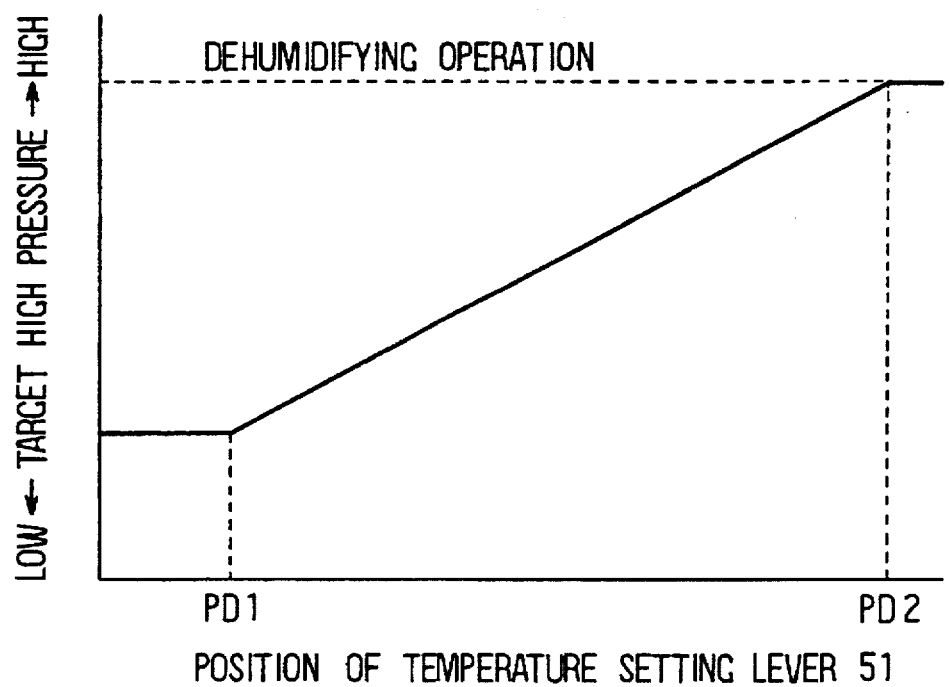
FIG. 5 is a graph showing a relationship between the position of the temperature setting lever and a target high pressure in a dehumidifying operation.
Figure 6:
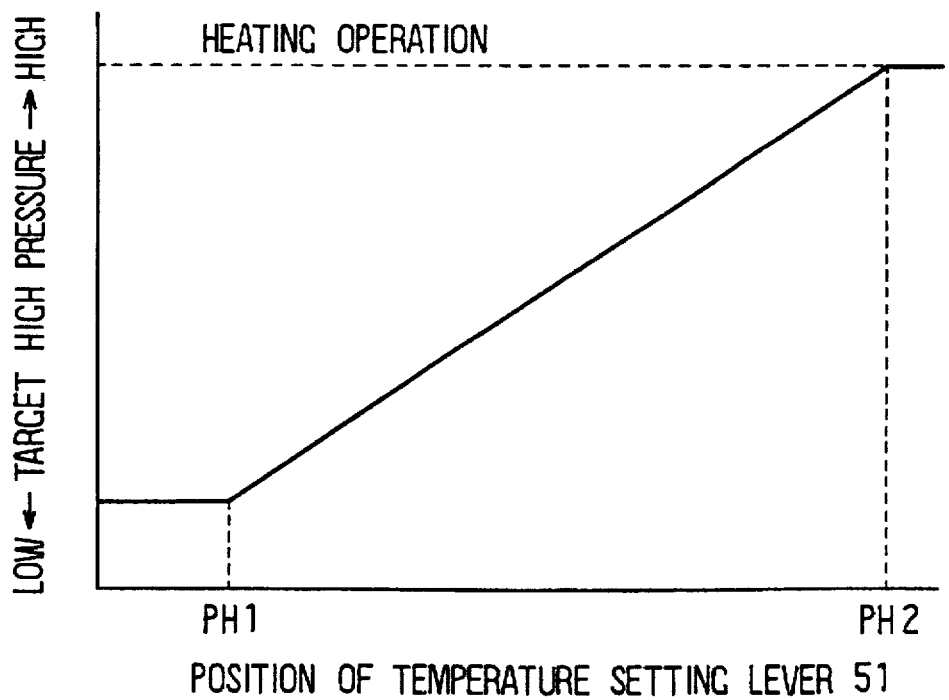
FIG. 6 is a graph showing a relationship between the position of the temperature setting lever and the target high pressure in a heating operation.

As shown in FIGS. 4, 5 and 6, the target temperature of the air blown out from the evaporator is set in cooling operation and the target high pressure is set in dehumidifying and heating operations under the movement of the operated position of the temperature setting lever 51.

The signal of the operated position of the temperature setting lever 51 is input to the control unit 40, and the control unit 40 controls the rotational speed of the compressor 22 so that the actual temperature of the air blown out from the evaporator or the actual high pressure which are detected by the sensor group 41 corresponds to the above mentioned target value. As a result, the blown-out air temperature is controlled.

The air conditioning panel 50 is also equipped with a speed switching lever 52 of the blower 7, an air conditioning switch 53 for intermitting the operation of the compressor 22, an air conditioning blown-out mode switching lever 54 for switching opening and closing of the blown-out air outlet switching doors 18–20, and an inside/outside air switching lever 55 for opening and closing the inside/outside air switching door 6.

Next, an operation in the above mentioned constitution will be described.

Figures 7, 8:
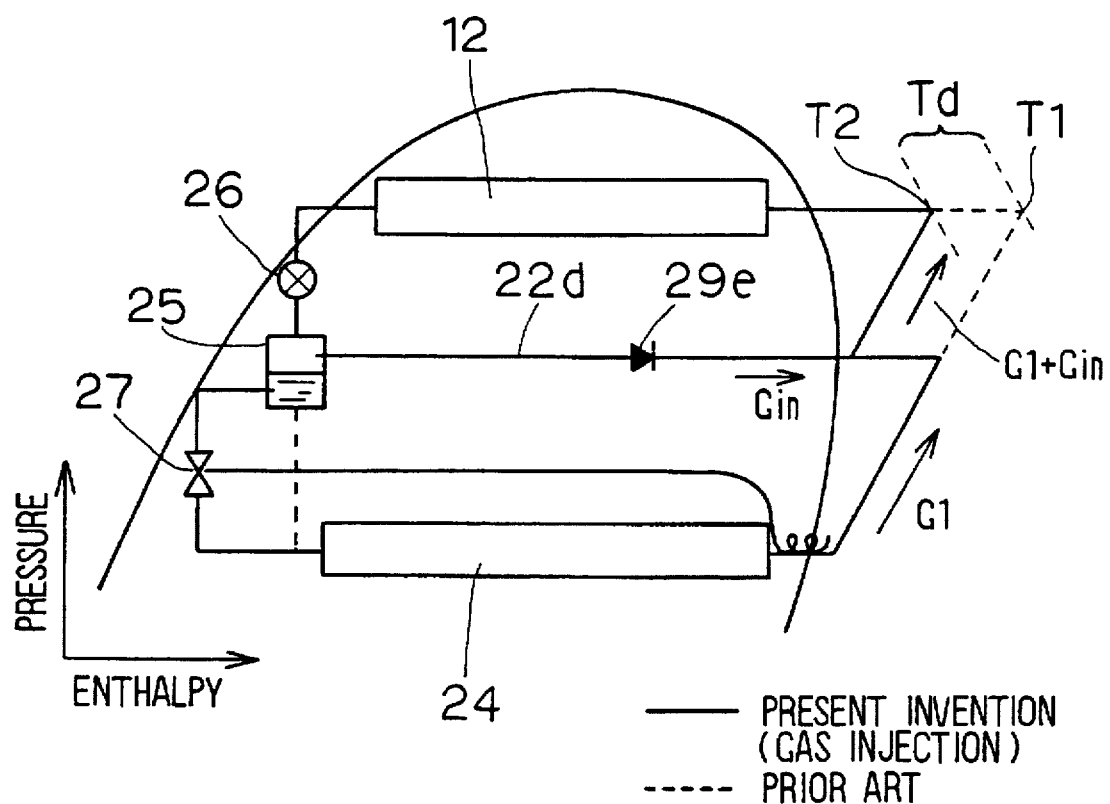
FIG. 7 is a table showing operated states of valves in each operation mode in the first embodiment.
FIG. 8 is a Mollier diagram showing the refrigerating cycle of the first embodiment in comparison with a prior art.

When the air conditioning switch 53 is turned on, the signal is input to the control unit 40 so as to start up the compressor 22. When the temperature setting lever 51 is moved between the PC1 position and the PC2 position shown in FIGS. 3, 4, the cooling mode is set. In the cooling mode, since the four-way valve 23 and the solenoid valves 28a, 28b are set by the control unit 40 to a state of the cooling mode as indicated in FIG. 7, the refrigerant flows in a route indicated by arrows C in the refrigerating cycle in FIG. 1.

That is, the overheated gaseous refrigerant discharged from the compressor 22 in a state of high temperature and high pressure flows into the outdoor heat exchanger 24 through the four-way valve 23 and the check valve 29b and then exchanges heat with the outside air blown by the outdoor fans 24a, whereby the gaseous refrigerant is condensed. Then, the solenoid valve 28a is closed, so that the refrigerant flowed out from the outdoor heat exchanger 24 passes through the check valve 29d and passes through the fixed throttle 26 wherein the pressure of the refrigerant is reduced so that the refrigerant becomes a gas-liquid two phase state having the middle pressure.

The refrigerant of gas-liquid two phase having the middle pressure flows into the gas-liquid separator 25, and is separated into the saturated gaseous refrigerant and the saturated liquid refrigerant. The gaseous refrigerant flows out of a gaseous refrigerant outlet 25a on the upper portion of the gas-liquid separator 25 and reaches the gas injection port 22c through the gas injection passage 22d and the check valve 29e. The gaseous refrigerant having the middle pressure is injected from the port 22c into the compressor 22 being on the compressing process.

On the other hand, the liquid refrigerant within the gas-liquid refrigerant 25 flows out of a liquid refrigerant outlet 25b opened near the bottom of the separator 25 and passes through the thermostatic expansion valve 27 wherein the pressure of the liquid refrigerant is reduced. Therefore, the refrigerant flows into the evaporator 11 through the solenoid valve 28b. The refrigerant absorbs the heat of the air blown by the blower 7, thus being evaporated in the evaporator 11. The cool air cooled by endotherm in the evaporator 11 is usually blown off from the face air outlet 9 and cools the passenger compartment.

The gaseous refrigerant evaporated in the evaporator 11 is sucked into the suction port 22b of the compressor 22 through the refrigerant suction passage 22e. At that time, the temperature of the refrigerant sucked into the compressor 22 is detected by the temperature sensing bulb 27a disposed in the refrigerant suction passage 22e and input to the expansion valve 27, whereby the expansion valve 27 adjusts the flowing amount of the refrigerant which flows into the evaporator 11 so that the overheating degree of the compressor suction refrigerant is maintained at the predetermined value.

Next, when the temperature setting lever 51 is moved between the PH1 position and the PH2 position in FIGS. 3 and 6, the heating mode is set. In the heating mode, since the four-way valve 23 and the solenoid valves 28a and 28b are set by the control unit 40 to a state of the heating mode as indicated in FIG. 7, the refrigerant flows in a route indicated by arrows H in the refrigerating cycle in FIG. 1.

That is, the gaseous refrigerant discharged from the compressor 22 flows into the condenser 12 on the indoor side through the four-way valve 23 and exchanges (radiates) heat in the condenser 12 with the air blown by the blower 7 so as to be condensed in the condenser 12. The warm air heated by radiating of the gaseous refrigerant is mainly blown out from the foot air outlet 8 into and heats the passenger compartment.

The refrigerant flowed out of the condenser 12 passes through the check valve 29c and the fixed throttle 26 wherein the pressure of the refrigerant is reduced, so that the refrigerant becomes the gas-liquid two phase state having the middle pressure.

The gas-liquid phase refrigerant having the middle pressure flows into the gas-liquid separator 25. The gaseous refrigerant separated in the separator 25 is sucked into the gas injection port 22c through the gaseous refrigerant outlet 25a formed on the upper portion of the separator 25, the gas injection passage 22d, and the check valve 29e.

On the other hand, the liquid refrigerant within the gas-liquid separator 25 flows out of the liquid refrigerant outlet 25b and passes through the thermostatic expansion valve 27 wherein the pressure of the liquid refrigerant is reduced, and then the refrigerant flows into the outdoor heat exchanger 24 through the check valve 29a. The refrigerant absorbs heat from the air (outside air) blown by the outside fans 24a, thus being evaporated in the outdoor heat exchanger 24.

The evaporated gaseous refrigerant is sucked into the suction port 22b of the compressor 22 through the solenoid valve 28a and the refrigerant suction passage 22e.

Next, when the temperature setting lever 51 is moved between the PD1 position and the PD2 position in FIGS. 3 and 5, the dehumidifying mode is set. In the dehumidifying mode, since the four-way valve 28a and the solenoid valves 28a and 28b are set to a state of the dehumidifying mode as indicated in FIG. 7 by the control unit 40, the refrigerant flows in a route indicated by arrows D in the refrigerating cycle in FIG. 1.

That is, the gaseous refrigerant discharged from the compressor 22 flows into the condenser 12 on the indoor side through the four-way valve 23 so as to be condensed by exchange (radiation) of heat with the air blown by the blower 7. The refrigerant flowed out of the condenser 12 passes through the check valve 29c and the fixed throttle 26 wherein the pressure of the refrigerant is reduced, whereby the refrigerant becomes the gas-liquid two phase state having the middle pressure.

The gas-liquid phase refrigerant having the middle pressure flows into the gas-liquid separator 25. The gaseous refrigerant separated in the separator 25 is sucked into the gas injection port 22c through the gaseous refrigerant outlet 25a formed on the upper portion of the separator 25, the gas injection passage 22d and the check valve 29e.

On the other hand, the liquid refrigerant within the gas-liquid separator 25 flows out of the liquid refrigerant outlet 25b of the separator 25 and passes through the thermostatic expansion valve 27 wherein the pressure of the refrigerant is reduced, and then the refrigerant flows into the evaporator 11 through the opened solenoid valve 28b. In this case, since the solenoid valve 28a is closed, the refrigerant, pressure of which is reduced in the thermostatic expansion valve 27, does not flow toward the outdoor heat exchanger 24.

The refrigerant flowed into the evaporator 11 is sucked into the compressor 22 after being evaporated by endotherm from the air blown by the blower 7.

As described above, in the dehumidifying mode, the refrigerant flows through the evaporator 11 as well as the condenser 12, and therefore the blown-out air from the blower 7 is first cooled and dehumidified in the evaporator 11 and then re-heated in the condenser 12. Since the amount of radiating of the refrigerant in the condenser 12 is equivalent to the total of the amount of endotherm in the evaporator 11 and the consumption of electric power, the air temperature on the air outlet side of the condenser 12 is higher than the air temperature sucked from the air inlets 3, 4, and 5. Consequently, it is possible to perform heating while dehumidifying the air.

Next, an improvement of the heating capacity when the outside air temperature is low, which is one of the features of the present invention, will be described referring to a Mollier diagram in FIG. 8. In the conventional heat pump system, when the outside air temperature is low in the heating operation, the suction pressure is lowered, whereby the specific volume of the refrigerant becomes large. Therefore, the refrigerant circulating amount G1 sucked into the compressor 22 is reduced, whereby the heating capacity is lowered. The compression ratio is increased because of the decrease in the suction pressure, so that the discharge refrigerant temperature Td of the compressor 22 rises to T1 in FIG. 8. Consequently, the compressor can not be used at its maximum capacity (maximum rotation frequency) to protect itself.

However, in the present invention, the refrigerant having the middle pressure is separated into the gaseous refrigerant and the liquid refrigerant in the gas-liquid separator 25 and the separated gaseous refrigerant is returned (gas-injected) into the compressor 22 being on the compressing process through the gas injection passage 22d. Therefore, the work of compression is performed as much as the total amount of the refrigerant circulating amount G1 sucked into the compressor 22 and the gas-injected refrigerant amount Gin. As a result, the amount of the work of compression is increased, whereby the amount of the radiating of the refrigerant in the condenser 12 is increased, thus improving the heating capacity.

At the same time, the saturated gaseous refrigerant is gas-injected into the compressor 22 being on the compressing process, so that the gaseous refrigerant being compressed and heated is cooled. Therefore, the discharge refrigerant temperature Td is lowered to T2 in FIG. 8. Consequently, the compressor 22 can be used at its maximum capacity (maximum rotational speed).

According to the above mentioned embodiment, the heating capacity is improved effectively when the outside air temperature is low. Further, in the cooling operation and the dehumidifying operation, the refrigerant is gas-injected to the compressor 22, whereby a coefficient of performance is increased, thus improving the cooling and the dehumidifying capacity.

A second embodiment of the present invention will be described.

Figure 9:
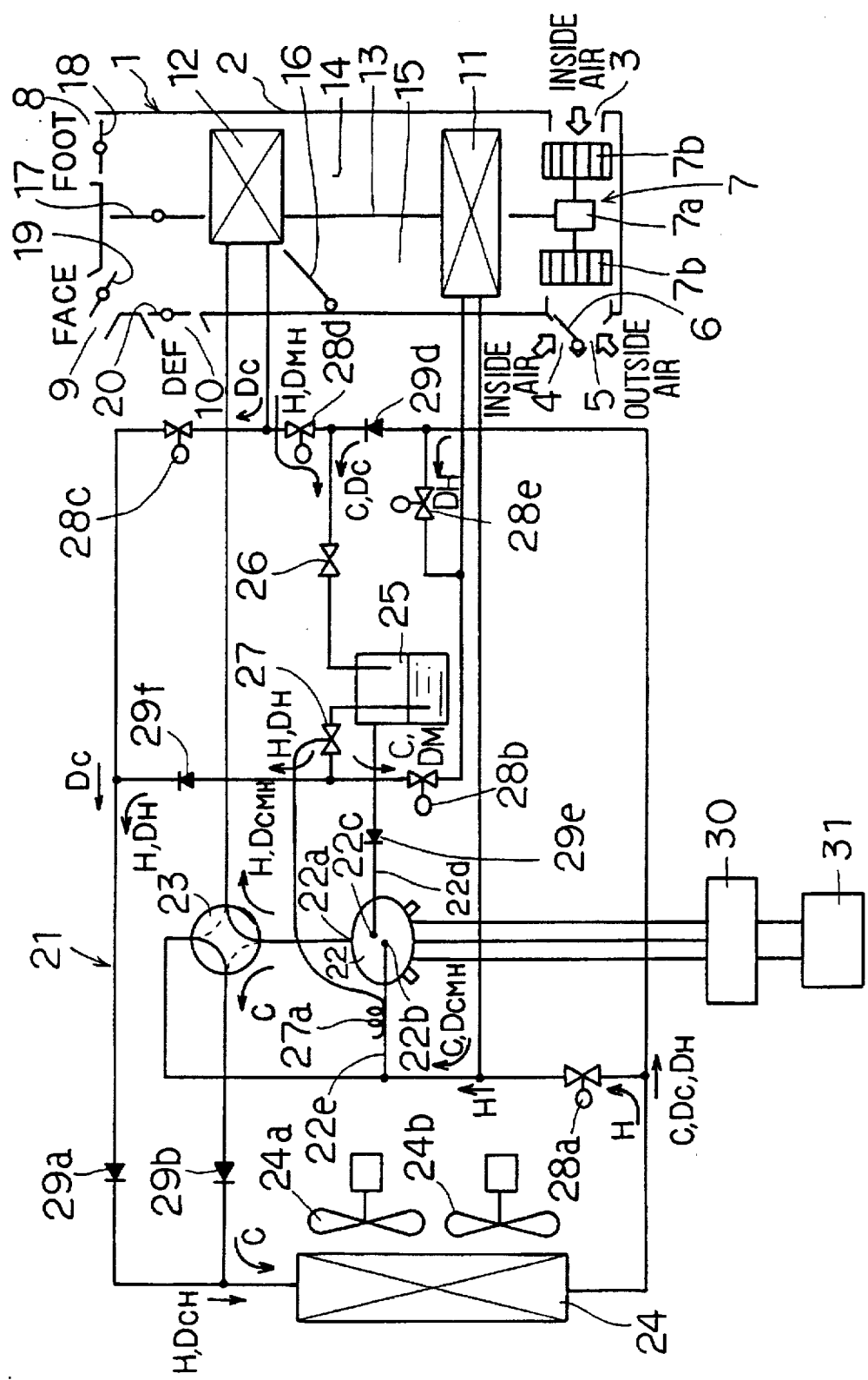
FIG. 9 is a diagram showing a refrigerating cycle in a second embodiment.

FIG. 9 schematically shows a refrigerating cycle and FIG. 10 shows operated states of valves in each operation mode in the second embodiment. In the second embodiment, solenoid valves 28c–28e and a check valve 29f are added to the first embodiment. In FIG. 9, although a control unit 40 and the like are not shown, the added solenoid valves 28c–28e are also opened or closed by the control unit 40 with a specification indicated in FIG. 10 according to the operated position of a temperature setting lever 51, so that the operation mode is switched.

In the second embodiment, when the cooling mode is set according to the operated position of the temperature setting lever 51, the refrigerant circulates through the following route as indicated by arrows C in FIG. 9; a compressor 22→ a four-way valve 23→ a check valve 29b→ an outdoor heat exchanger 24→ a check valve 29d→ a fixed throttle 26→ a gas-liquid separator 25→ a thermostatic expansion valve 27→ a solenoid valve 28b→ an evaporator 11→ the compressor 22. In the evaporator 11, the air blown by the blower 7 is cooled so as to cool the passenger compartment.

The gaseous refrigerant having the middle pressure separated in the gas-liquid separator 25 is gas-injected into the compressor 22 being on the compressing process through a gas injection passage 22d. In all modes described below, the gaseous refrigerant separated in the gas-liquid separator 25 is also gas-injected.

When the heating mode is set according to the operated position of the temperature setting lever 51, the refrigerant circulates through the following route as indicated by arrows H in FIG. 9; the compressor 22→ the four-way valve 23→ a condenser 12→ the solenoid valve 28b→ the fixed throttle 26→ the gas-liquid separator 25→ the thermostatic expansion valve 27→ the check valve 29f→ a check valve 29a→ the outdoor heat exchanger 24→ the solenoid valve 28a→ the compressor 22. The air blown by the blower 7 is heated in the condenser 12 to heat the passenger compartment.

When the low-temperature dehumidifying mode C is set by the operated position of the temperature setting lever 51, the refrigerant circulates through the following rout as indicated by arrows $D_c$ in FIG. 9; the compressor 22→ the four-way valve 23→ the condenser 12→ a solenoid valve 28c→ the check valve 29a→ the outdoor heat exchanger 24→ the check valve 29d→ the fixed throttle 26→ the gas-liquid separator 25→ the thermostatic expansion valve 27→ the solenoid valve 28b→ the evaporator 11→ the compressor 22. The air, which is blown by the blower 7 and cooled in the evaporator 11, is re-heated in the condenser 12 to dehumidify and heat the passenger compartment.

When the middle-temperature dehumidifying mode M is set according to the operated position of the temperature setting lever 51, the refrigerant circulates through the following route as indicated by arrows $D_M$ in FIG. 9; the compressor 22→ the four-way valve 23→ the condenser 12→ the solenoid valve 28d→ the fixed throttle 26→ the gas-liquid separator 25→ the thermostatic expansion valve 27→ the solenoid valve 28b→ the evaporator 11→ the compressor 22. The blown-out air cooled in the evaporator 11 is re-heated in the condenser 12 to dehumidify and heat the passenger compartment.

When the high-temperature dehumidifying mode H is set according to the operated position of the temperature setting lever 51, the refrigerant circulates through the following route as indicated by arrows $D_H$ in FIG. 9; the compressor 22→ the four-way valve 23→ the condenser 12→ the solenoid valve 28d→ the fixed throttle 26→ the gas-liquid separator 25→ the thermostatic expansion valve 27→ the check valve 29f→ the check valve 29a→ the outdoor heat exchanger 24→ the solenoid valve 28e→ the evaporator 11→ the compressor 22. The blown-out air cooled in the evaporator 11 is re-heated in the condenser 12 to dehumidify and heat the passenger compartment.

Next, the differences among the dehumidifying modes C, M, and H are described. In the low-temperature dehumidifying mode C, since the outdoor heat exchanger is disposed on the high pressure side in the cycle (upstream side of the fixed throttle 26) and functions as a condenser, the amount of endotherm in the indoor evaporator 11 is radiated in both of the indoor condenser 12 and the outdoor heat exchanger 24. Therefore, the blown-out air temperature from the indoor condenser 12 is lowered as much as the amount of the radiated heat in the outdoor heat exchanger 24.

In the middle-temperature dehumidifying mode M, since the outdoor heat exchanger is excluded from the refrigerant route, all amount of endotherm in the indoor evaporator 11 is radiated in the indoor condenser 12. As a result, the blown-out air temperature from the indoor condenser 12 is increased.

In the high-temperature dehumidifying mode H, the outdoor heat exchanger 24 is disposed on the low pressure side in the cycle (downstream side of the thermostatic expansion valve 27) and functions as an evaporator. Therefore, the amount of the heat absorbed in both of the indoor evaporator 11 and the outdoor heat exchanger 24 is radiated in the indoor condenser 12. As a result, the blown-out air temperature from the indoor condenser 12 is more increased.

Figure 11:
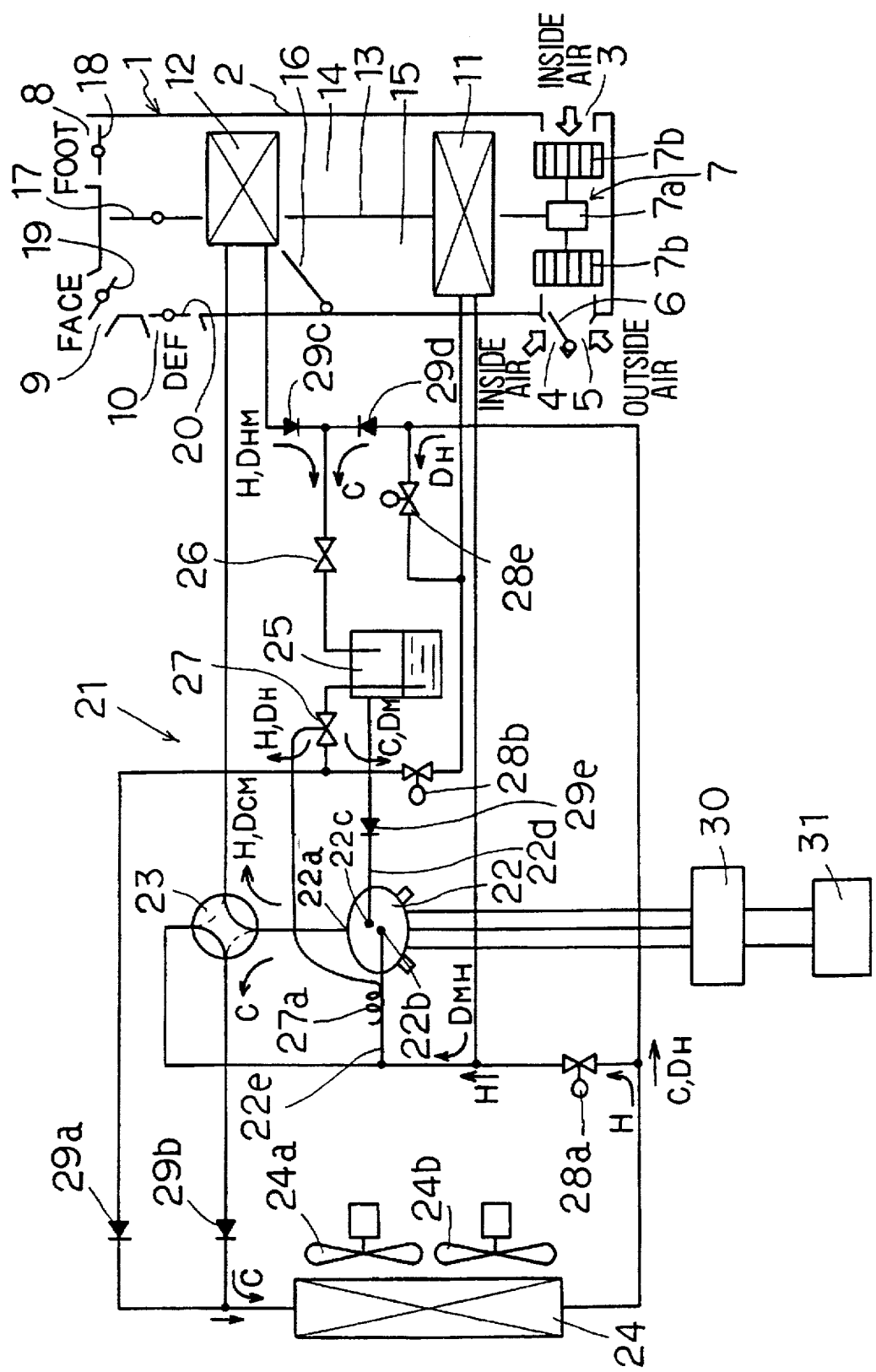
FIG. 11 is a diagram showing a refrigerating cycle in a third embodiment.

A third embodiment of the present invention will be described with reference to FIGS. 11 and 12.

In the third embodiment, the solenoid valves 28c and 28d in the second embodiment are not used to delete the function of the low-temperature dehumidifying mode C. Therefore, the constitution of the refrigerating cycle is simplified. The other features of the third embodiment are same as the second embodiment.

A fourth embodiment of the present invention will be described.

Figure 13:
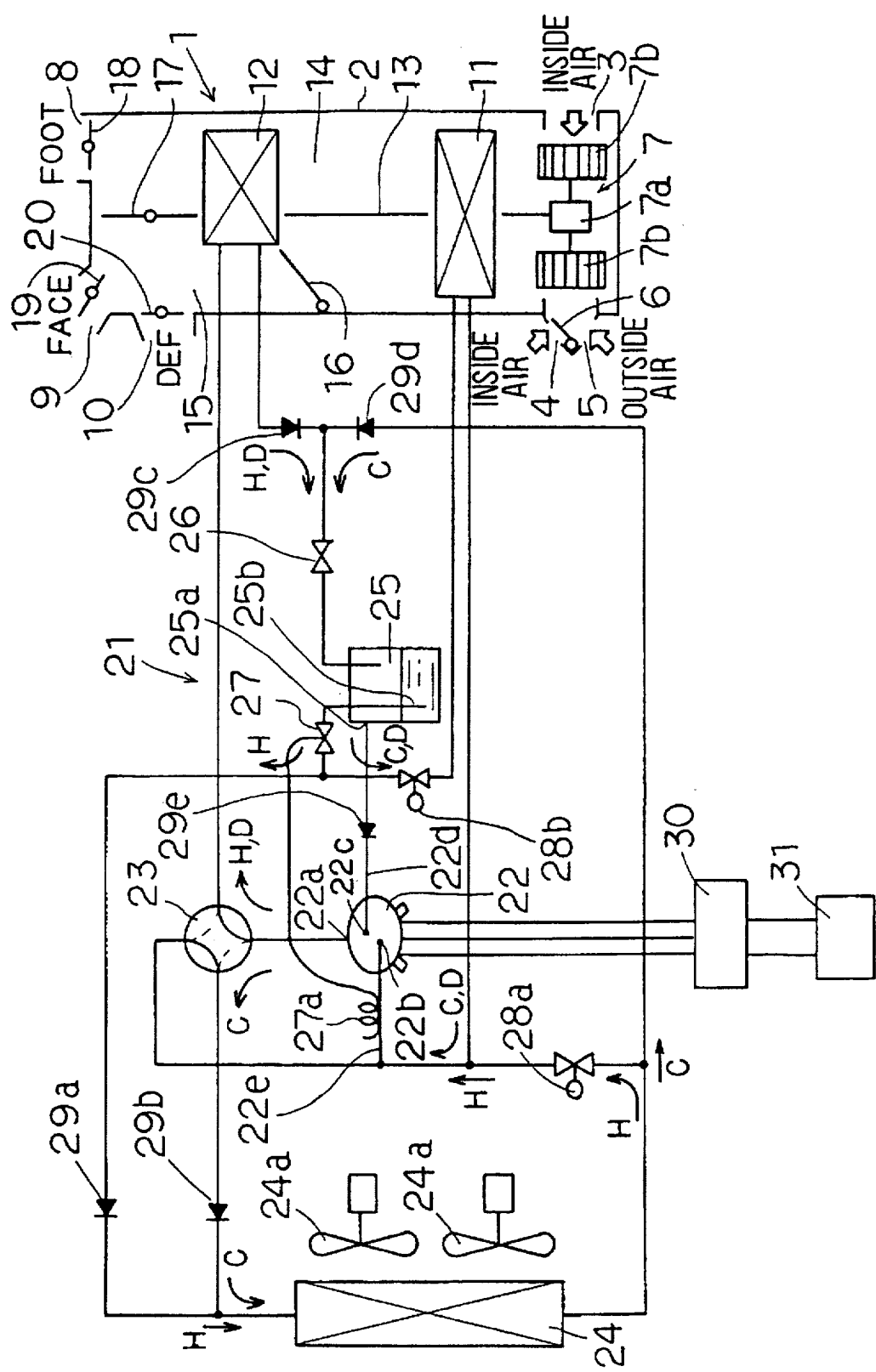
FIG. 13 is a diagram showing a refrigerating cycle in a fourth embodiment

FIG. 13 schematically shows a refrigerating cycle of the fourth embodiment. In this embodiment, as shown in FIG. 13, an electric expansion valve 126 is used instead of the fixed throttle 26 in the first embodiment shown in FIG. 1. The other components and circulating routes of the refrigerant in a refrigerating cycle are same as the first embodiment shown in FIGS. 1-6, and the detail explanation thereof is omitted.

Figure 14:
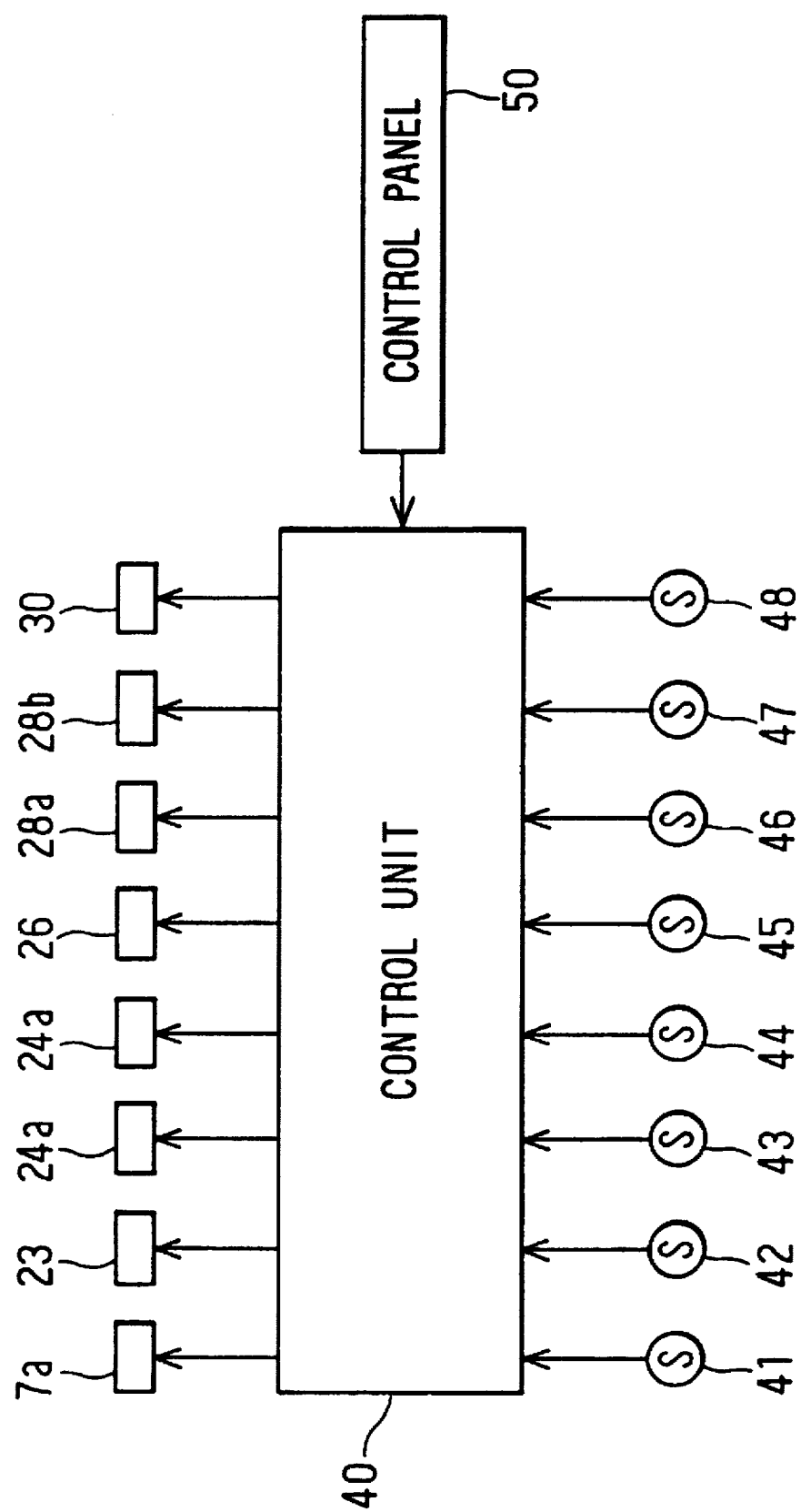
FIG. 14 is a block diagram showing a control system in the fourth embodiment.

FIG. 14 is a block diagram showing a control system in the fourth embodiment. An microcomputer consisting of CPU, ROM, RAM and the like is disposed within a control unit 40.

To the control unit 40 is input each signal from an output air temperature sensor 41 for detecting the output air temperature, an suction air temperature sensor 42 for detecting the air temperature in a suction side of an indoor heat exchanger 11 for cooling, a post-evaporator air temperature sensor 43 for detecting the temperature of the air which has just passed through the indoor heat exchanger 11 for cooling, an indoor heat exchanger outlet refrigerant temperature sensor 44 for detecting the temperature of the refrigerant which has been just flowed out from an indoor heat exchanger 12 for heating, an outdoor heat exchanger outlet refrigerant temperature sensor 45 for detecting the temperature of the refrigerant which has been just flowed out from an outdoor heat exchanger 24, a discharge refrigerant temperature sensor 46 for detecting the temperature of the refrigerant which has been discharged from a compressor 22, a high-pressure sensor 47 for detecting the refrigerant pressure in an inlet of the electric expansion valve 26, and a line current sensor 48 for detecting line current of an inverter 30. Further, signals from each of levers and switches provided on a control panel 50 (see in FIG. 14) disposed on the front surface within the passenger compartment are transmitted to the control unit 40.

The above mentioned signals are input to the microcomputer through input circuits (not shown) within the control unit 40.

The microcomputer carries out predetermined process (described later), so that a fan motor 7a, an electromagnetic four-way valve 23, outdoor electric fans 24a, the electric expansion valve 26, solenoid valves 28a and 28b, and the inverter 30 are controlled on the basis of the results of the process. When a key-switch (not shown) of a vehicle is turned on, a battery 31 mounted on the vehicle supplies electricity to the control unit 40.

Figure 15:
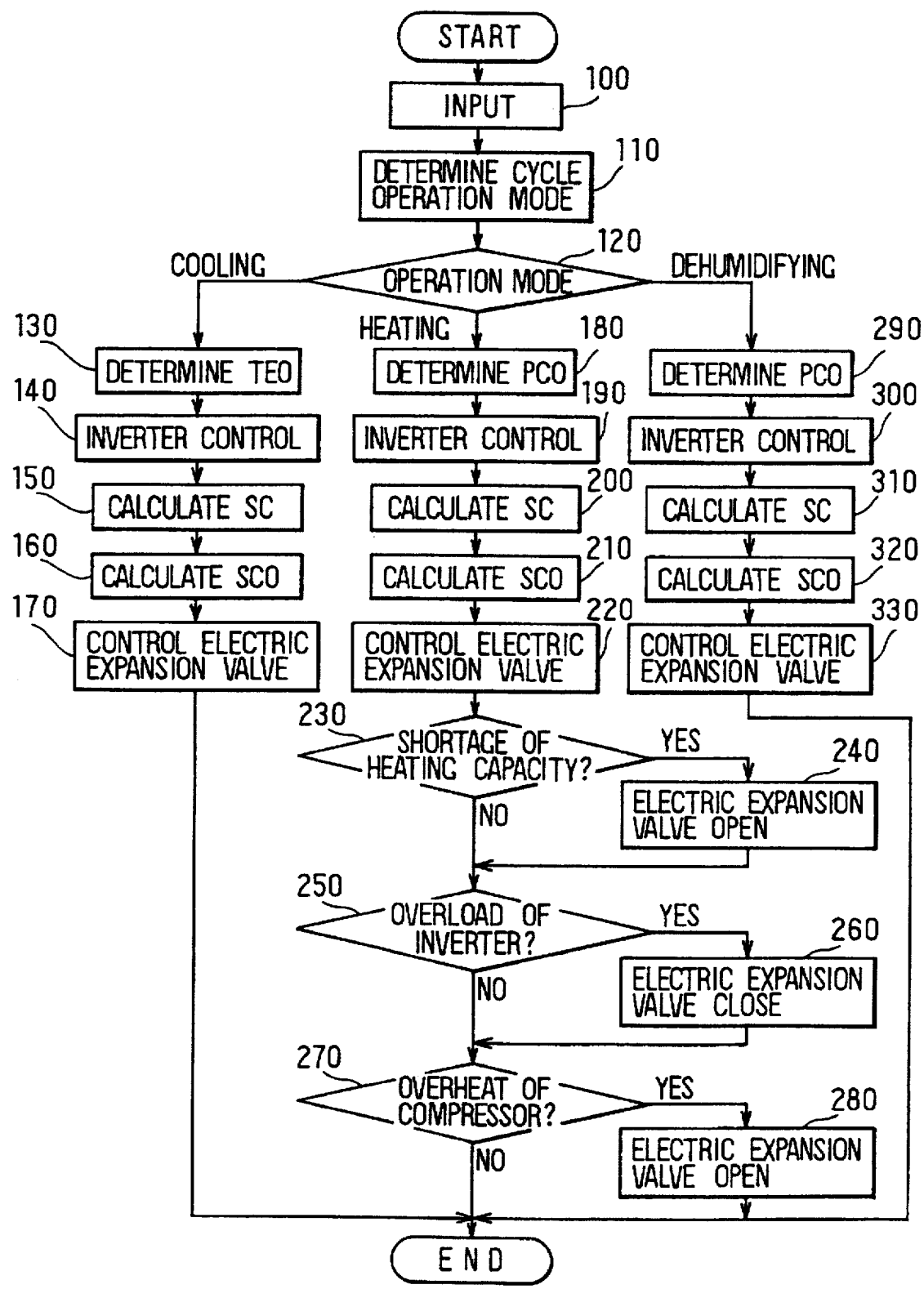
FIG. 15 is a flow chart showing a control process by a microcomputer in the fourth embodiment.

Next, control processes for controlling the electric expansion valve 26 and the inverter 30 executed by the microcomputer in the control unit 40 are described referring to a flow chart in FIG. 15.

When electricity is supplied to the control unit 40 after the key-switch is turned on, routines shown in FIG. 15 are started up. Firstly, each signal from the above mentioned sensors 41–48 and control panel 50 is input in a step 100. In next step 110, an operation mode in the refrigerating cycle is set according to an operated position of a temperature setting lever 51 as shown in FIG. 3.

In the next step 120, it is determined which operation mode is set in the step 110. Then, when a cooling mode is determined, the process of steps 130–170 is performed, when a heating mode is determined, the process of steps 180–280 is performed, or when a dehumidifying mode is determined, the process of steps 290–330 is performed.

Firstly, a case where the cooling mode is determined in the step 120 is described.

In the step 130, a target blown-out air temperature TEO according to the operated position of the temperature setting lever 51 is determined by searching a map shown in FIG. 4 stored in the ROM. In the next step 140, the inverter is controlled so that the air temperature (the temperature of the air which has just passed through the indoor cooling heat exchanger 11) detected by the post-evaporator air temperature sensor 43 is set to the TEO.

In the next step 150, the supercooling degree of the condensed liquid refrigerant in the outdoor heat exchanger 24 is calculated on the basis of the following formula (1).

$$SC = T(Ph) - T_{os} \quad (1)$$

wherein, $T_{os}$ is a detected value by the outdoor heat exchanger outlet refrigerant temperature sensor 45. $T(Ph)$ is the refrigerant condensation temperature calculated with a detected value by the high pressure sensor 47. That is, the detected value by the high pressure sensor 47 corresponds to the refrigerant condensation pressure. Therefore, in the embodiment, a map (not shown) showing correlation between the refrigerant condensation pressure and the refrigerant condensation temperature is stored in the ROM, so that the refrigerant condensation temperature corresponding to the detected value by the high pressure sensor 47 is calculated by searching the map.

Figure 16:
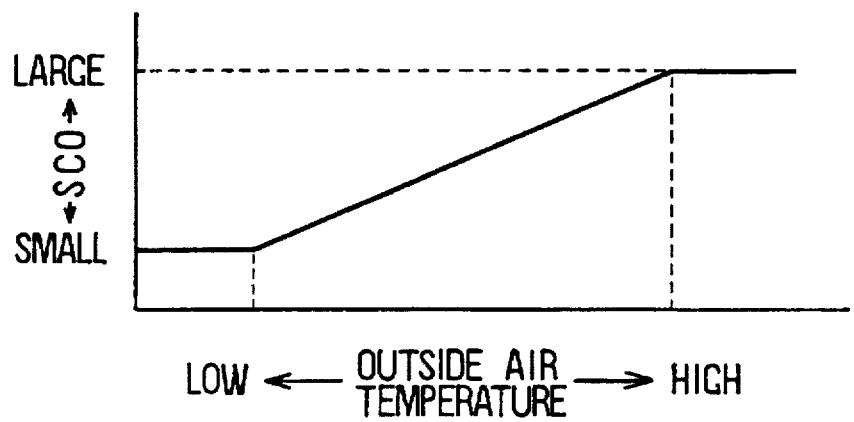
FIG. 16 is a graph showing a relationship between an outside air temperature and a target supercooling degree SCO in the fourth embodiment.

In the next step 160, the target supercooling degree SCO, which corresponds to the outside air temperature detected by the outside air temperature sensor 41, is calculated by searching a map shown in FIG. 16 stored in the ROM. Therefore the cooling efficiency COP (= radiating ability Q / power w c the compressor 22) in the refrigerating cycle 21 can be set its maximum value while the radiating ability Q in the outdoor heat exchanger 24 is optimized.

That is, in summer when the outside air temperature is generally high, the higher the outside air temperature the more the compressor 22 is operated to cool the pass, compartment, whereby the cooling capacity is secured. Therefore, the higher the high pressure becomes, the higher the refrigerant temperature in the outdoor heat exchanger 24 becomes. As a result, the difference between the refrigerant temperature and the outside air temperature becomes large, namely the radiating ability Q in the outdoor heat exchanger 24 becomes large.

Therefore, even when the target supercooling degree SCO is calculated as a large value and as a result the power W of the compressor 22 is increased, since the ability Q becomes larger than that, the cooling efficiency COP becomes large. Therefore, when the outside air temperature is high, the target supercooling degree SCO is calculated as a large value.

In the next step 170, the opening degree of the electric expansion valve 26 is controlled so that the supercooling degree SC calculated in the step 150 is set to the target supercooling degree SCO calculated in the step 160. Specifically, a deviation ΔSC between the SC and the SCO is calculated at first. Then, a changing opening degree ΔEVC of the electric expansion valve 26 corresponding to the deviation ΔSC is calculated from a map (not shown) stored in the ROM. The actual opening degree of the electric expansion valve is increased or decreased with the changing opening degree ΔEVC.

Next, a case where the dehumidifying mode is determined in the step 120 is described.

In a step 290, a target high pressure PCO corresponding to the operated position of the temperature setting lever 51 is determined by a search of a map shown in FIG. 5 stored in the ROM. In the next step 300, the inverter 30 is controlled so that the high pressure detected by the high pressure sensor 47 becomes to be the PCO.

In the next step 310, a supercooling degree SC of the condensed refrigerant in the indoor heating heat exchanger 12 is calculated on the basis of the following formula (2).

$$SC = T(Ph) - T_{c\epsilon} \quad (2)$$

wherein, $T_{c\epsilon}$ is a detected value of the indoor heat exchanger outlet refrigerant temperature sensor 44.

Figure 17:
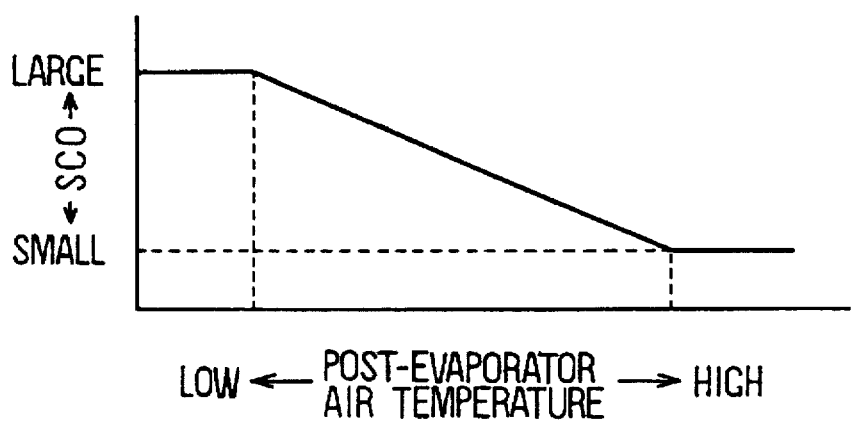
FIG. 17 is a graph showing a relationship between a post-evaporator air temperature and the target supercooling degree SCO in the fourth embodiment.

In the next step 320, a target supercooling degree SCO corresponding to the air temperature which is detected by the post-evaporator air temperature sensor 43 is calculated by searching a map shown in FIG. 17 stored in the ROM. Therefore, the dehumidification efficiency COP (=radiating ability Q/the power W of the compressor 22) in the refrigerating cycle can be set to its maximum value while the radiating ability Q in the indoor heating heat exchanger 12 is optimized.

The air temperature detected by the post-evaporator air temperature sensor 43 corresponds to the temperature of the air passing through the indoor heating heat exchanger 12. Therefore, when the air temperature detected by the post-evaporator air temperature sensor 43 is low, it means that the difference of temperature between the refrigerant temperature in the indoor heating heat exchanger 12 and the temperature the air passing through the heat exchanger 12 is large. T is, it means that the radiant heat ability Q is large.

Therefore, even when the target supercooling degree SCO is calculated as a large value and as a result the power W of the compressor 22 is increased, since the ability Q becomes larger than that, the dehumidifying efficiency COP becomes large. Therefore, when the air temperature after passing through the evaporator is low, the target supercooling degree SCO is calculated as a large value.

In the next step 330, the electric expansion valve 126 is controlled so that the supercooling degree SC calculated in the step 310 is set to the target supercooling degree SCO calculated in the step 320. Since the specific controlling method of the step 330 is same as that of the step 170, the explanation is omitted.

Next, a case where the heating mode is determined in the step 120 is described.

In the step 180, the target high pressure PCO according to the operated position of the temperature setting lever 51 is determined by searching a map shown in FIG. 6 stored in the ROM. In the next step 190, the inverter 30 is controlled so that the high pressure detected by the high pressure sensor 47 is set to the PCO.

In the next step 200, the supercooling degree SC of the condensed liquid refrigerant in the indoor heating heat exchanger 12 is calculated on the basis of the formula (2).

Figure 18:
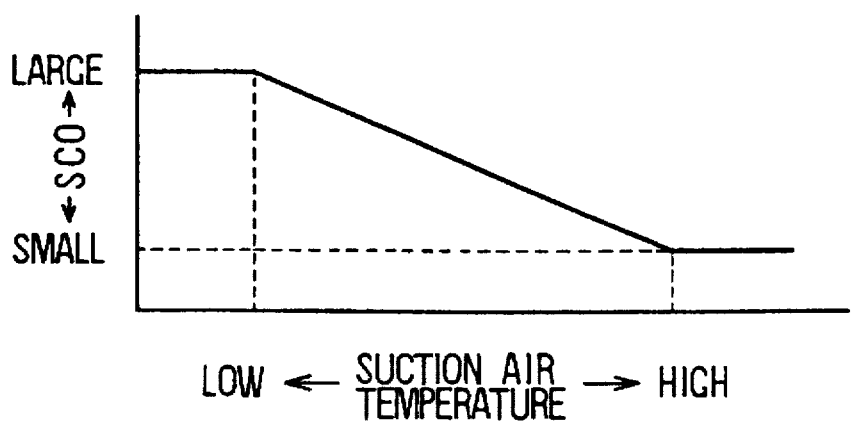
FIG. 18 is a graph showing a relationship between a suction air temperature and the target supercooling degree SCO in the forth embodiment.

In the next step 210, the target supercooling degree SCO corresponding to the suction air temperature detected by the suction air temperature sensor 42 is calculated by searching a map shown in FIG. 18 stored in the ROM. Therefore, the heating efficiency COP (= the radiating ability Q / the power W of the compressor 22) of the refrigerating cycle can be set to its maximum value while the radiating heat ability Q in the indoor heating heat exchanger 12 is optimized.

That is, in the heating mode, since the refrigerant does not flow in the indoor cooling heat exchanger 11, the suction air temperature (the air temperature in the suction side of the indoor cooling heat exchanger 11) detected by the suction air temperature sensor 42 corresponds to the temperature of the air passing through the indoor heating heat exchanger 12. Therefore, when the air temperature detected by the suction air temperature sensor 42 is low, it means that the difference of the temperature between the refrigerant temperature in the indoor heating heat exchanger 12 and the temperature of the air passing through the heat exchanger 12 is large. That is, it means that the radiating ability Q is large.

Therefore, even when the target supercooling degree SCO is calculated as a large value and as a result the power W of the compressor 22 is increased, since the ability Q becomes larger than that, the dehumidifying efficiency COP becomes large. Therefore, when the suction air temperature is low, the target supercooling degree SCO is calculated as a large value In the next step 220, the electric expansion valve 126 is controlled so that the supercooling degree SC calculated in the step 200 is set to the target supercooling degree SCO calculated in the step 210. Since the specific controlling method of the step 220 is same as that of the step 170, the explanation is omitted.

The heating capacity is basically controlled by the rotational speed of the compressor and the opening degree of the electric expansion valve 126 is controlled so that efficiency COP of the refrigerating cycle 21 becomes its maximum by performing the steps 180–200. However, at the shortage of the heating capacity where the high pressure does not reach the target high pressure PCO despite the maximum rotational speed of the compressor such as at the beginning of the rapid heating for the passenger compartment, even if efficiency of the refrigerating cycle 21 is lowered a little, the heating capacity must be improved.

Therefore, in this embodiment, in the next step 230, when the compressor is rotated with its maximum rotational speed, it is determined whether the high pressure detected by the high pressure sensor 47 reaches the target high pressure PCO. In this step, when it is determined that the high pressure is smaller than the target high pressure PCO, the heating capacity is considered to be short. Therefore, in the next step 240, the electric expansion valve 126 is opened with a required opening degree. Further, the rotational speed of the compressor can be detected on the basis of the inverter frequency input to the control unit 40.

Figure 19:
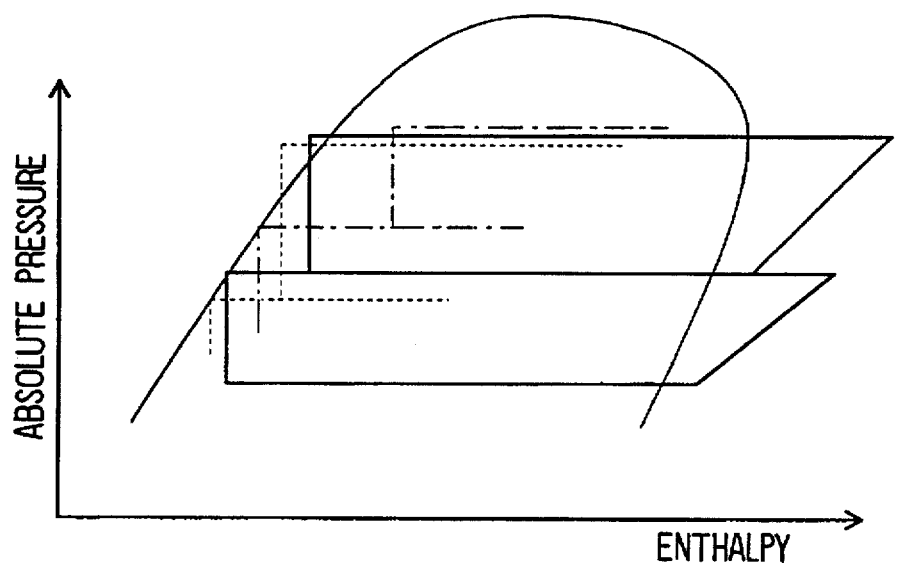
FIG. 19 is a Mollier diagram showing the refrigerating cycle of the fourth embodiment.
Figure 20:
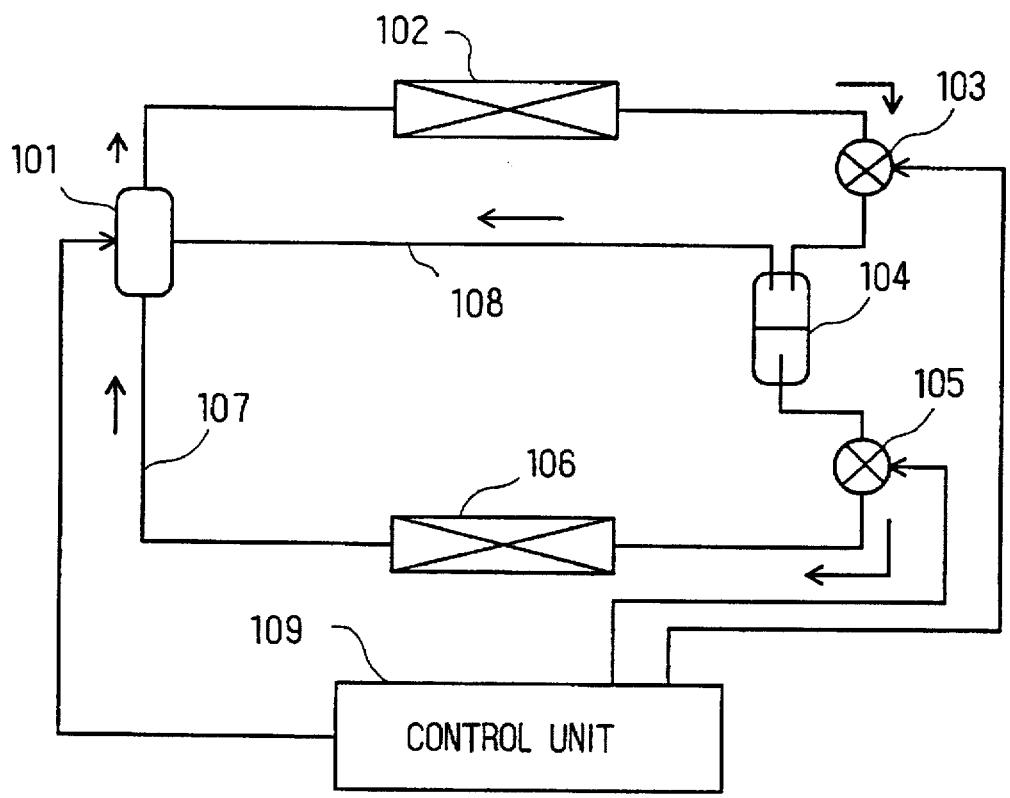
FIG. 20 is a diagram showing a conventional refrigerating cycle having a gas-injection system.

For example, when the refrigerating cycle 21 is stabilized in a state as shown by a solid line in a Mollier diagram in FIG. 19, the electric expansion valve 126 is opened with the required opening degree by performing the step 240. As a result, the refrigerating cycle 21 is stabilized in a state shown by a single-point chain line in FIG. 19. Therefore, the amount of the gas-injected refrigerant to the compressor 22 is increased. The work of compression is performed as much as the total of an amount of the circulating refrigerant sucked into the compressor 22 from a suction port 22b and the amount of the gas-injected refrigerant. Therefore, although the amount of the work of compression is increased and efficiency of the refrigerating cycle 21 is lowered, the amount of the radiating heat of the refrigerant in the indoor heating heat exchanger 12 is increased, thus improving the heating capacity. Consequently, the above mentioned shortage of the heating capacity is solved.

Further, when the electric expansion valve 126 is opened by performing the step 240, the amount of the gas-injected refrigerant increases, and the amount of the work (load) of the compressor 22 increases in accordance with the opening degree of the electric expansion valve 126, whereby the load of the inverter 30 becomes large.

Therefore, in the next step 250, it is determine, whether the line current of the inverter 30, which is detected by the line-current sensor 48, is over a predetermined current, whereby it is determined whether the inverter 30 is in an overload state. When it is determined that the line-current of the inverter 30 is over the predetermined current, the electric expansion valve 126 is closed with a required opening degree. Therefore, since the amount of gas-injected refrigerant is reduced, the load of the inverter 30 can be prevented from being exceeded.

Further, in the next step 270, it is determined whether the discharge refrigerant temperature detected by the discharge refrigerant temperature sensor 46 is over a predetermined temperature, whereby it is determined whether the temperature in the compressor 22 is over the allowable temperature. When it is determined that the discharge refrigerant temperature is over the predetermined temperature, the electric expansion valve 126 is opened with a required opening degree. Therefore, the amount of the gas-injected refrigerant is increased, whereby the discharge refrigerant temperature is lowered.

As described above, in the embodiment, when the heating capacity is sufficient in the heating mode, the electric expansion valve 126 is controlled so that the efficiency of the refrigerating cycle 21 becomes the maximum. When the heating capacity is insufficient in the beginning of the rapid heating, the opening degree of the electric expansion valve 126 is increased so that the amount of the gas-injected refrigerant is increased, whereby the heating capacity is improved. As a result, the heating capacity can be improved while the efficiency of the refrigerating cycle 21 can be ensured.

In the above mentioned embodiment, although the shortage of the heating capacity is determined on the basis of the high pressure, it may be determined on basis of the temperature of the air which has just passed through the indoor heating heat exchanger 12. It is also acceptable for the shortage of the heating capacity to be determined based on a physical value concerning to the heating capacity.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An air conditioning apparatus for a vehicle having a passenger compartment, comprising:

a casing having an air passage therein, in which an air inlet is formed on an end thereof for sucking air and an air outlet is formed on the other end thereof for blowing out air into said passenger compartment;

a blower disposed in said air passage for blowing air from said air inlet to said air outlet through said air passage;

an evaporator disposed in said air passage, for cooling air;

a condenser disposed in said air downage on a downstream side of said evaporator, for heating air;

an outdoor heat exchanger disposed outside said air passage, for exchanging heat between outside air and a refrigerant;

an compressor having a suction port for sucking said refrigerant on low pressure side in a refrigerating cycle, a gas injection port for injecting middle pressure gaseous refrigerant into said refrigerating cycle and a discharge port for discharging compressed refrigerant;

first pressure reducing means for reducing pressure of said refrigerant in high pressure side to middle pressure;

a gas-liquid separator for separating said refrigerant, pressure of which is reduced in said first pressure reducing means to said middle pressure, into gas and liquid;

introducing means for introducing gaseous refrigerant separated in said gas-liquid separator to said gas injection port; and second pressure reducing means for reducing pressure of liquid refrigerant separated in said gas-liquid separator;

wherein in a heating operation, said refrigerant circulates through said compressor, said condenser, said first pressure reducing means, said gas-liquid separator, said second pressure reducing means, and said outdoor heat exchanger in this order, while said gaseous refrigerant separated in said gas-liquid separator is introduced into said gas injection port by said introducing means;

in a cooling operation, said refrigerant circulates at least through said compressor, said outdoor heat exchanger, said second pressure reducing means and said evaporator in this order, and in a dehumidifying operation, said refrigerant circulates at least through said compressor, said condenser, said second pressure reducing means and said evaporator in this order.

2. An air conditioning apparatus according to claim 1, wherein said introducing means is a gas injection path.

3. An air conditioning apparatus according to claim 1, wherein said gaseous refrigerant, which is separated in said gas-liquid separator, is introduced into said gas injection port by said introducing means in said cooling and said dehumidifying operations.

4. An air conditioning apparatus according to claim 1, wherein said compressor is electrically operated.

5. An air conditioning apparatus according to claim 4, further comprising:
an electric motor for driving said compressor.

6. An air conditioning apparatus according to claim 1, further comprising:
rotational speed adjusting means for adjusting a rotational speed of said compressor;
route switching means for switching a circulating route of said refrigerant;
control means for controlling said rotational speed adjusting means and said route switching means; and
a temperature control operation member, which is manually operated, for setting a target value of adjusted rotational speed of said compressor into said control means;
wherein
said control means controls said route switching means according to said target value input from said temperature control operation means.

7. An air conditioning apparatus according to claim 1, wherein said first pressure reducing means includes a throttle portion, throttle amount of which is electrically controlled.

8. An air conditioning apparatus according to claim 7, further comprising:
rotational speed control means for controlling rotational speed of said compressor so that a heating capacity in said condenser is set to a predetermined capacity;
first throttle amount control means for controlling said throttle amount of said first pressure reducing means so that supercooling degree of liquid refrigerant in said condenser is set to a predetermined degree;
heating capacity determining means for determining whether said heating capacity reaches said predetermined capacity in said condenser; and
second throttle amount control means for controlling said first pressure reducing means so as to open said throttle amount thereof when it is determined that said heating capacity in said condenser does not reach said predetermined capacity by said heating capacity determining means.

9. An air conditioning apparatus according to claim 8, wherein said heating capacity determining means determines whether said heating capacity in said condenser reaches said predetermined capacity when rotational speed of said compressor is its maximum.

10. An air conditioning apparatus according to claim 8, wherein said predetermined supercooling degree is one where coefficient of performance in said refrigerating cycle becomes its maximum.

11. An air conditioning apparatus according to claim 7, comprising:
load detecting means for detecting load of said compressor;
load determining means for determining whether load detected by said load detecting means is over a predetermined value; and
third throttle amount control means for controlling said first pressure reducing means to close said throttle amount when it is determined that said load of said compressor is over said predetermined value.

12. An air conditioning apparatus according to claim 7, comprising:
temperature detecting means for detecting temperature of said compressor;
temperature determining means for determining whether temperature detected by said temperature detecting means is over a predetermined temperature; and
fourth throttle control means for controlling said first pressure reducing means to open said throttle amount when it is determined that said temperature of said compressor is over said predetermined temperature.

13. An air conditioning apparatus for a vehicle having a passenger compartment, comprising:
a casing having an air passage, in which an air inlet is formed on an end thereof for sucking air and an air outlet is formed on the other end thereof for blowing out air into a passenger compartment;
a blower disposed in said air passage, for blowing air from said air inlet to said air outlet through said air passage;
an evaporator disposed in said air passage, for cooling air;
a condenser disposed in said air passage on a downstream side of said evaporator, for heating air;
an outdoor heat exchanger disposed outside said air passage, for exchanging heat between outside air and a refrigerant;
an compressor having a suction port for sucking said refrigerant on low pressure side in a refrigerating cycle, a gas injection port for injecting middle pressure gaseous refrigerant in said refrigerating cycle and a discharge port for discharging compressed refrigerant;
first pressure reducing means for reducing pressure of said refrigerant on high pressure side to middle pressure;
a gas-liquid separator for separating said refrigerant, pressure of which is reduced in said first pressure reducing means to said middle pressure, into gas and liquid;
introducing means for introducing gaseous refrigerant separated in said gas-liquid separator into said gas injection port; and
second pressure reducing means for reducing pressure of liquid refrigerant separated in said gas-liquid separator;
wherein
in a heating operation, said refrigerant circulates through said compressor, said condenser, said first pressure reducing means, said gas-liquid separator, said second pressure reducing means, and said outdoor heat exchanger in this order, while said gaseous refrigerant separated in said gas-liquid separator is introduced to said gas injection port by said introducing means;
in a cooling operation, said refrigerant circulates at least through said compressor, said outdoor heat exchanger, said second pressure reducing means and said evaporator in this order;
in a first dehumidifying operation, said refrigerant circulates at least through said compressor, said condenser, said outdoor heat exchanger, said second pressure reducing means and said evaporator in this order;
in a second dehumidifying operation, said refrigerant circulates at least through said compressor, said condenser, said second pressure reducing means and said evaporator in this order; and
in a third dehumidifying operation, said refrigerant circulates at least through said compressor, said condenser, said second pressure reducing means, said outdoor heat exchanger and said evaporator in this order.

14. An air conditioning apparatus for a vehicle having a passenger compartment, comprising:

a casing having an air passage in which an air inlet is formed on an end thereof for sucking air and an air outlet is formed on the other end thereof for blowing out air into said passenger compartment;

a blower disposed in said air passage, for blowing air from said air inlet to said air outlet through said air passage;

an evaporator disposed in said air passage, for cooling air;

a condenser disposed in said air passage on a downstream side of said evaporator, for heating air;

an outdoor heat exchanger disposed outside said air passage, for exchanging heat between outside air and a refrigerant;

a compressor having a suction port for sucking said refrigerant on low pressure side in a refrigerating cycle, a gas injection port for injecting middle pressure gaseous refrigerant in said refrigerating cycle and a discharge port for discharging compressed refrigerant;

first pressure reducing means for reducing pressure of said refrigerant in high pressure side to middle pressure;

a gas-liquid separator for separating said refrigerant, pressure of which is reduced in said first pressure reducing means to said middle pressure, into gas and liquid;

introducing means for introducing gaseous refrigerant separated in said gas-liquid separator to said gas injection port; and second pressure reducing means for reducing pressure of liquid refrigerant separated in said gas-liquid separator; wherein in a heating operation, said refrigerant circulates through said compressor, said condenser, said first pressure reducing means, said gas-liquid separator, said second pressure reducing means, and said outdoor heat exchanger in this order, while said gaseous refrigerant separated in said gas-liquid separator is introduced into said gas injection port by said introducing means;

in a cooling operation, said refrigerant circulates at least through said compressor, said outdoor heat exchanger, said second pressure reducing means and said evaporator in this order;

in a first dehumidifying operation, said refrigerant circulates at least through said compressor, said condenser, said second pressure reducing means and said evaporator in this order; and in a second dehumidifying operation, said refrigerant circulates at least through said compressor, said condenser, said second pressure reducing means, said outdoor heat exchanger and said evaporator in this order.

\* \* \* \* \*